P. F. WADHAM.
FISHING REEL.
APPLICATION FILED JUNE 28, 1909.

975,587.

Patented Nov. 15, 1910.

Witnesses.
C. Heymann
M. Hindman

Inventor
Percy Frank Wadham
por
B. Singer
Attorney.

UNITED STATES PATENT OFFICE.

PERCY FRANK WADHAM, OF NEWPORT, ISLE OF WIGHT, ENGLAND.

FISHING-REEL.

975,587.  Specification of Letters Patent.  Patented Nov. 15, 1910.

Application filed June 28, 1909. Serial No. 504,836.

*To all whom it may concern:*

Be it known that I, PERCY FRANK WADHAM, residing at "Waltondale," Carisbrooke Road, Newport, Isle of Wight, England, Great Britain, have invented a certain new and useful Improvement in Fishing-Reels; and I do hereby declare the following to be a full, clear, and exact description of the invention, such as will enable others skilled in the art to which it appertains to make and use the same.

My invention relates to improvements in fishing reels and consists in improved mechanism for starting and controlling the revolving drum or spool, and means for indicating the pressure set up by the brake so that with any particular weight of bait used the paying out and control of the line may be rendered constant.

To enable my invention to be better understood I will now proceed to describe the same more particularly by reference to the accompanying drawing in which:—

Figure 1:
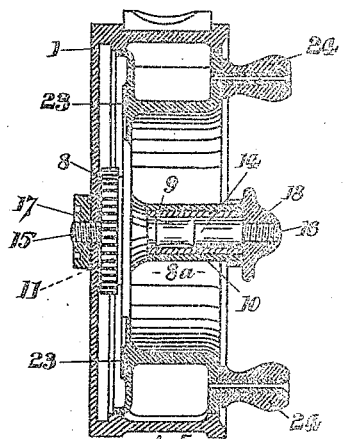
Figure 4:
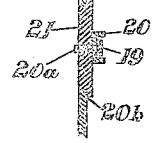
Figure 2:
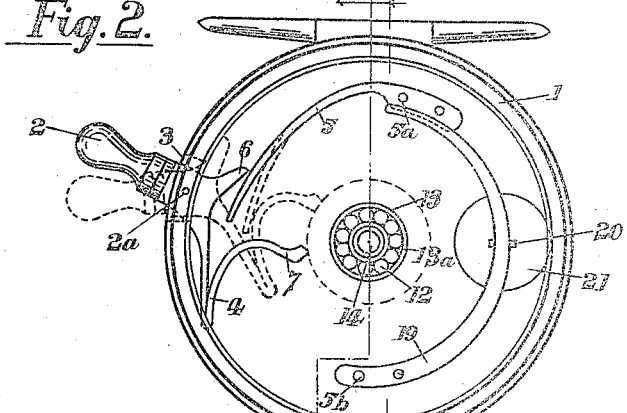
Figure 5:
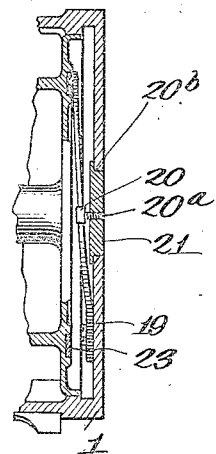
Figure 3:
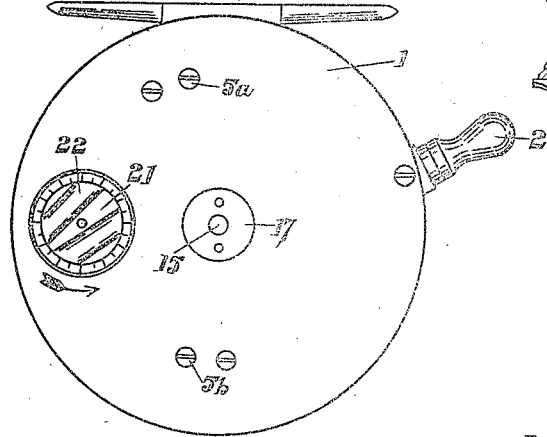

Figure 1. shows partly in vertical section, the drum and the reel or frame in which it revolves, taken on line 1—1 of Fig. 2. Fig. 2. is a front elevation of the reel or frame showing the apparatus employed for starting the drum and part of the braking mechanism, and brake indicator. Fig. 3. shows the underside of the reel or frame and the face of the brake indicator. Fig. 4. shows detail of the braking mechanism. Fig. 5 is a sectional view on line 5—5 of Fig. 2.

In the drawings —1— is the reel or frame, —2— is the trigger pivoted as at —2ª— in a slot —3— formed in the side of the reel or frame. This trigger which may be formed of bone or other suitable material is fastened to the extremity of a spring compressing and tripping lever —4— in any suitable manner, the function of said lever being to depress the spring —5— fastened by screws —5ª— to the back of the reel or frame, by spur —6—. The lower part of the tripping lever is fashioned to the shape shown at —7— and so formed that it shall rest flat on hub —8— of drum —8ª— and be held there by spring —5— which bears on tripping lever —4—, see dotted lines Fig. 2. said hub —8— being fastened to the back of the drum —8ª— and surrounding the base of a sleeve —9— preferably bushed with suitable metal as at —10—. The underside of the milled or serrated hub is recessed as at —11— so as to form a cup or cover for the balls —12— contained in the race —13— formed on spindle —14— and kept in same by small steel washer —13ª—. The spindle —14— is threaded at its upper and lower end —15—, —16—, and is secured to the back of the reel or casing by thread —15— and lock nut —17— a cap —18— being screwed on to the upper thread —16— of spindle —14—. —19— shows the brake spring secured by screws or the like —5ᵇ— to the back of the reel. This as shown passes through a fork —20— screwed as at —20ª— into the indicator —21— see Fig. 3. which is recessed into the back of the reel as at —20ᵇ— see detail view Fig. 4. the underside of the indicator being milled out as at —22— see Fig. 3. so as to enable it to be turned upon the thread of fork —20— passing through it. A groove is chased out of the drum —8ª— which if made of aluminium, wood or soft metal is fitted with a ring of gun metal or the like —23— to provide a path for the brake spring —19— which presses more or less against it; but if the drum is formed of harder metal such as brass or the like this ring —23— may be dispensed with.

I have shown the trigger —2— with tripping lever —4— in dotted and full lines see Fig. 2. The dotted lines show approximately the position occupied by the trigger for starting the drum when casting a line. The full lines show approximately the position occupied by the trigger after making a cast.

The operation of my invention is as follows:—The drum —8ª—having been passed over the spindle —14— the cap —18— is screwed upon the threaded end —16— of said spindle. To start the drum —8ª— all that is necessary is to pull the trigger —2— sharply upward, and hold there. This causes the part —7— of tripping lever —4— as it is sprung out of engagement with the milled or plain hub to set the drum —8ª— in rapid motion. On trigger —2— being released after making a cast the point —7— is brought to bear upon the milled or plain hub by spring —5— pressing against spur —6— which has the desired effect of slowing up the drum, and prevent overrunning.

The braking mechanism is operated as follows:—The indicator see Fig. 3. is turned to the required amount in the direction of the arrow. This causes the fork —20— to push up the brake spring —19— so that stronger pressure is exerted on the ring of gun metal or like material —23— or on the surface of drum —8ᵃ— if harder metal is used, thereby retarding the action of the drum. It is clear that having once determined the braking power for a given bait, this can be readily found again, or readjusted for any other conditions.

The winding in of the line is effected in the well known manner by means of the handles —24—. The first part of a turn of the drum —8ᵃ— in winding in the line serves to cock the tripping lever —4— and bring same into the position shown for starting the drum see dotted lines Fig. 2.

Having thus described my invention, what I claim as new and desire to secure by Letters Patent is:—

1. In a fishing reel, the combination with a rotating member for the line, a relatively fixed element rotatively supporting said member, a manually operable device carried by said element and provided with a yielding extension engaging a portion of said rotating member and formed and arranged to assume arresting and release positions with respect thereto, and means normally acting on said device to thrust said extension into an arresting position.

2. In a fishing reel, the combination with a rotating member for the line having a circular roughened surface, a relatively fixed element rotatively supporting said member, a pivoted trigger on said element provided with a yielding extension engaging said roughened surface and formed and arranged to assume arresting and release positions with respect thereto, and a spring acting on said trigger to normally thrust said extension into an arresting position.

3. In a fishing reel, the combination with a rotating member for the line, a relatively fixed element rotatively supporting said member, and a manually operable device carried by said element and provided with means engaging a portion of said rotating member for imparting thereto an initial rapid rotary movement when casting.

4. In a fishing reel, the combination with a rotating member for the line, a relatively fixed element rotatively supporting said member, and a manually operable device carried by said element and provided with yielding means engaging a portion of said rotating member for imparting thereto an initial rapid rotary movement when casting.

5. In a fishing reel, the combination with a rotating member for the line, a relatively fixed element rotatively supporting said member, a manually operable device carried by said element and provided with means engaging a portion of said member for imparting thereto an initial rapid rotary movement when casting and also formed and arranged to assume an arresting position for retarding movement of said member, and means normally acting on said device to thrust said means into an arresting position.

6. In a fishing reel, the combination with a frame, a member for the line rotatively mounted on the frame and provided with an engaging surface, and a lever pivotally mounted on said frame and having a yielding extension arranged to be automatically collapsed into a braking position against said surface when said member is rotated to wind the line and serving when said lever is manually operated to impart an initial rapid unwinding rotation to said member and free the same from drag.

7. In a fishing reel, the combination with a frame, a member for the line rotatively mounted on the frame and provided with an engaging surface, and a lever pivotally mounted on said frame and having a yielding extension arranged to be automatically collapsed against said surface and into a braking position by winding rotation of the member and serving when said lever is manually operated to impart an initial rapid unwinding rotation to said member.

8. In a fishing reel, the combination with a frame, a member for the line rotatively mounted on the same and provided with an engaging surface, a lever pivotally mounted on the frame and having a yielding extension arranged to be automatically collapsed to a braking position against said surface when said member is rotated to wind the line, and serving when said lever is manually operated to impart an initial rapid unwinding rotation to said member, and a spring normally holding said lever in a braking position.

In testimony whereof I affix my signature in presence of two witnesses.

PERCY FRANK WADHAM.

Witnesses:
 HARVEY J. BAVERSTOCK,
 CHAS. GACK.